(12) United States Patent
Mehr

(10) Patent No.: US 9,890,881 B2
(45) Date of Patent: Feb. 13, 2018

(54) PIPE FITTING

(71) Applicant: Ralph Mehr, London (GB)

(72) Inventor: Ralph Mehr, London (GB)

(73) Assignee: Ralph Mehr, Stratford (GB)

( * ) Notice: Subject to any disclaimer, the term of this patent is extended or adjusted under 35 U.S.C. 154(b) by 166 days.

(21) Appl. No.: 14/404,472

(22) PCT Filed: May 30, 2013

(86) PCT No.: PCT/IB2013/001114
§ 371 (c)(1),
(2) Date: Nov. 27, 2014

(87) PCT Pub. No.: WO2013/179127
PCT Pub. Date: Dec. 5, 2013

(65) Prior Publication Data
US 2015/0330543 A1  Nov. 19, 2015

(30) Foreign Application Priority Data

May 30, 2012 (GB) .................................. 1209568.3

(51) Int. Cl.
*F16L 21/03* (2006.01)
*F16L 21/00* (2006.01)
(Continued)

(52) U.S. Cl.
CPC ............ *F16L 21/007* (2013.01); *F16L 21/03* (2013.01); *F16L 37/146* (2013.01); *F16L 41/021* (2013.01)

(58) Field of Classification Search
CPC ....... F16L 37/146; F16L 21/007; F16L 21/03; F16L 41/14
See application file for complete search history.

(56) References Cited

U.S. PATENT DOCUMENTS 4,289,339 A * 9/1981 Hansen ................ F16L 37/146
                                                    285/305
4,401,324 A * 8/1983 Rumble ................ F16L 37/146
                                                    285/369
(Continued)

FOREIGN PATENT DOCUMENTS

CN        2120244 U    10/1992
CN        1163367 A    10/1997
(Continued)

OTHER PUBLICATIONS

International Search Report for PCT/IB2013/001114, search report dated Oct. 29, 2013.
(Continued)

*Primary Examiner* — David E Bochna
*Assistant Examiner* — James A Linford
(74) *Attorney, Agent, or Firm* — Marc Van Dyke; Fourth Dimension IP

(57) ABSTRACT

A pipe connection assembly including: (a) a housing; (b) a first opening disposed within the housing, the opening having an inner surface adapted to receive a first end of a first pipe element; (c) an open-ended channel disposed within a wall of the housing, the channel having a wide cross-section disposed distal to the first opening, and a narrow cross-section disposed between the wide cross-section and the first opening, the channel fluidly communicating with the first opening via the narrow cross-section; and (d) a lock pin having a backbone and a tooth extending longitudinally therefrom, the backbone adapted to be received by the wide cross-section, the tooth adapted to be received by the narrow cross-section, the pin adapted to be urged along the open ended channel, whereby a bottom edge of the tooth protrudes through the narrow cross-section into the opening.

19 Claims, 12 Drawing Sheets

(51) Int. Cl.
*F16L 41/02* (2006.01)
*F16L 37/14* (2006.01)

(56) References Cited

U.S. PATENT DOCUMENTS

| | | | |
|---|---|---|---|
| 4,701,074 A * | 10/1987 | Hall | E02B 17/0008 285/24 |
| 5,040,831 A | 8/1991 | Lewis | |
| 5,281,005 A * | 1/1994 | Babcock | B60B 35/04 285/305 |
| 5,779,283 A | 7/1998 | Kimura et al. | |
| 5,927,763 A | 7/1999 | Mehr | |
| 6,634,677 B2 | 10/2003 | Mehr | |
| 7,168,451 B1 * | 1/2007 | Dundas | F16L 57/04 138/109 |

FOREIGN PATENT DOCUMENTS

| | | | |
|---|---|---|---|
| CN | 202165735 U | 3/2012 | |
| EP | 0054173 A1 | 6/1982 | |
| EP | 0070561 A2 | 1/1983 | |
| EP | 1024324 A2 * | 8/2000 | F16L 37/146 |
| EP | 1882877 A2 | 1/2008 | |
| GB | 631745 A | 11/1949 | |
| GB | 1209568.3 A | 5/2012 | |

OTHER PUBLICATIONS

Written Opinion for PCT/IB2013/001114, written opinion dated Oct. 29, 2013.
Machine Translation of EP 0054173 (by EPO and Google)—published Jun. 23, 1982 Fischer Ag Georg.
Machine Translation of EP 0070561 (by EPO and Google)—published Jan. 26, 1983 Fischer Ag Georg.
Machine Translation of CN 2120244 (by EPO and Google)—published Oct. 28, 1992 Yang Mingdong.
Machine Translation of CN 1163367 (by EPO and Google)—published Oct. 29, 1997 Takenaka.
Machine Translation of CN 202165735 (by EPO and Google)—published Mar. 14, 2012 Shenzhen Luxon Optoelectronics Technology Co Ltd.
Chinese Search Report for CN 2013800387982, search report dated May 30, 2013.
Australian Examiner's Report for AU 2013269253, report dated Sep. 13, 2016.
UKIPO Search Report for GB1209568.3, report dated Aug. 25, 2012.

* cited by examiner

Prior Art

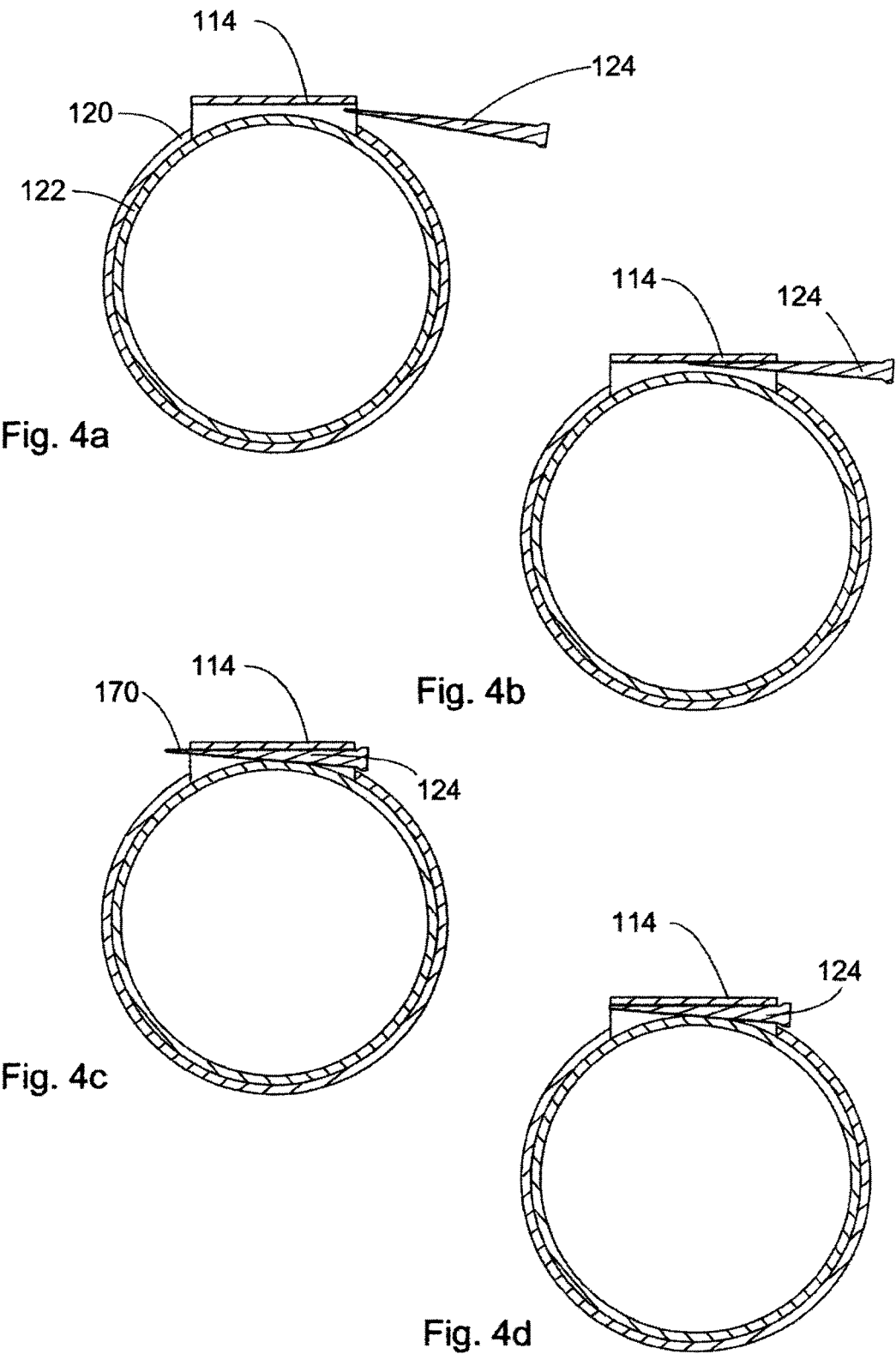

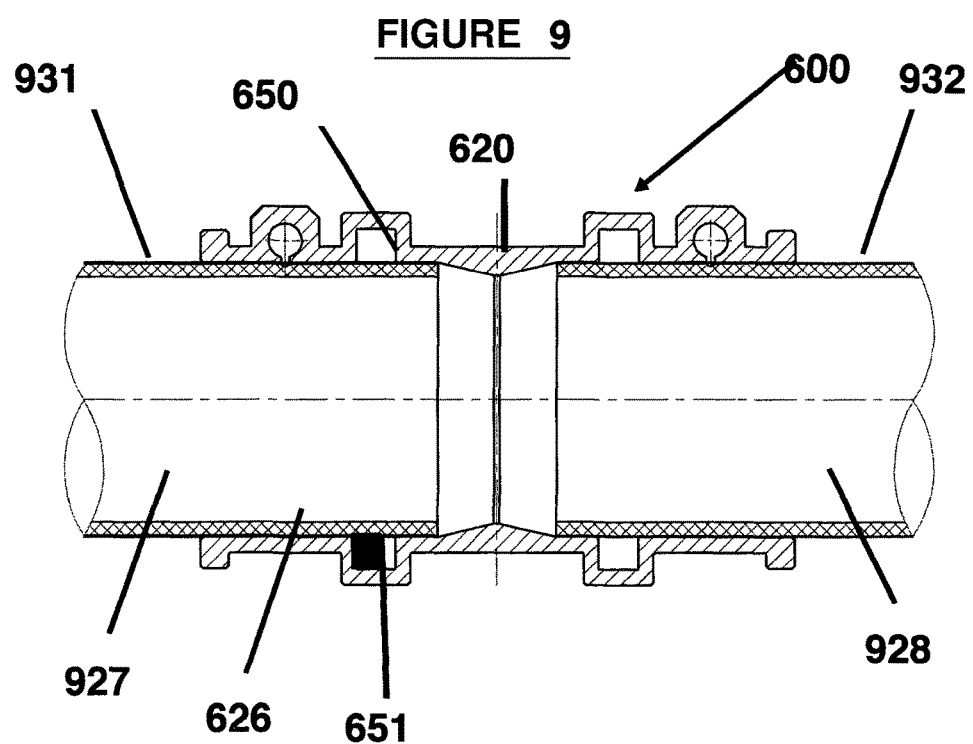

1100

FIGURE 15a
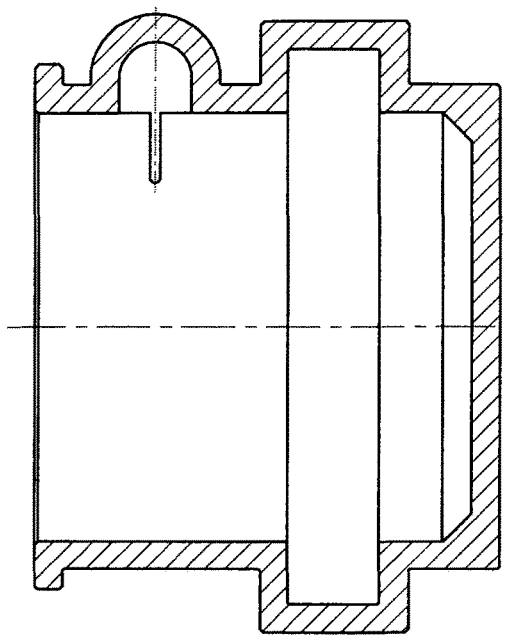
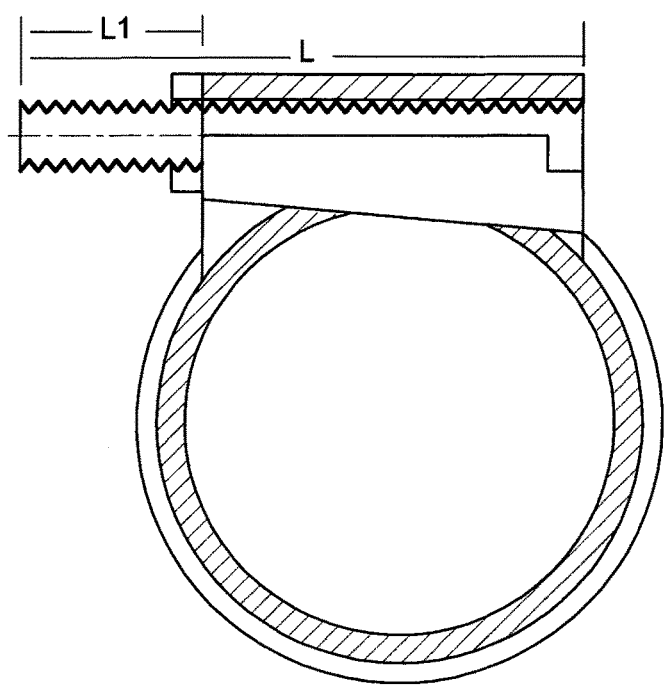
FIGURE 15b

PIPE FITTING

CROSS-REFERENCE TO RELATED APPLICATIONS

This application draws priority from UK Patent Application No. GB1209568.3, filed May 30, 2012, which application is incorporated by reference for all purposes as if fully set forth herein.

FIELD AND BACKGROUND OF THE INVENTION

The present invention relates to quickfit methods, fittings and apparatus for connecting pipes and pipe elements.

The present invention relates to pipes for carrying water and the like and, in particular, it concerns methods for connecting pipes and the corresponding pipe elements and connections.

Various techniques are known for connecting water pipes in fire prevention and domestic water supply systems. For many years, the only alternative to threading or flange connections was a labor intensive welding processes. More recently, a number of quick-assembly systems have been marketed. These systems seek to reduce the labor costs of assembly by providing various types of mechanical engagement to hold pipe ends together without requiring welding.

One quick-assembly system, disclosed in U.S. Pat. No. 5,040,831, is available commercially in the U.S. under the trade name POZ-LOK® from Southwestern Pipe, Inc. This system employs specially molded connector fittings which have slots on opposite sides. A pipe is inserted into the connector and a U-shaped bracket is hammered in through the slots. The bracket creates indents in the sides of the pipe, thereby retaining the pipe within the connector.

Another system is proposed by U.S. Pat. No. 5,779,283 to Kimura et al. This system is similar to the POZ-LOK® system, but uses a "key" member inserted in a channel formed in a connector on just one side of the pipe. The key member is disclosed as either a flat plate with a raised ridge or as a round pin. In the case of the round pin, the front of the pin is formed with a threaded section for fastening after insertion by use of a nut on the opposite side of the connector.

In order to produce a quick-fit system with lower production costs, a number of systems use thin-walled connectors that can readily be produced from modified sections of standard piping. An example of such a system is commercially available in the U.S. under the trade name PRESS-FIT™ from VICTAULIC®.

The PRESSFIT™ system employs a thin walled connector with an internal O-ring seal positioned around the end of a pipe. Engagement of the pipe within the connector is achieved using a special hydraulic circumferential press tool that makes a circumferential indent around the joint through both the connector and the pipe, thereby permanently fixing them together.

My U.S. Pat. Nos. 5,927,763 and 6,634,677 disclose a method for connecting a first end of a cylindrical pipe within a bore of a pipe element having a terminal portion having an internal diameter sufficient to receive the first end. In this method, the wall of the terminal portion of the pipe element is outwardly deformed to produce an approximately linear, open-ended channel in a direction roughly tangential to the internal surface of this terminal portion. The first end of the pipe is then positioned within the terminal portion, and a pin-like element is forced along the channel. This causes local inward deformation of the first end, thereby locking the first end and the pipe element together.

These improvements notwithstanding, the present inventor has recognized a need for improved quick-fit methods and devices for connecting pipes, and the subject matter of the present disclosure and claims is aimed at fulfilling this need.

SUMMARY OF THE INVENTION

According to teachings of the present invention there is provided a pipe connection assembly including: (a) a housing; (b) a first opening disposed within the housing, the opening having an inner surface adapted to receive a first end of a first pipe element; (c) an open-ended channel disposed within a wall of the housing, the channel having a wide cross-section disposed distal to the first opening, and a narrow cross-section disposed between the wide cross-section and the first opening, the channel fluidly communicating with the first opening via the narrow cross-section; and (d) a lock pin having a backbone and a tooth extending longitudinally therefrom, the backbone adapted to be received by the wide cross-section, the tooth adapted to be received by the narrow cross-section, the pin adapted to be urged along the open ended channel, whereby a bottom edge of the tooth protrudes through the narrow cross-section into the opening.

According to teachings of the present invention there is provided a pipe connection assembly including: (a) a housing; (b) a first opening disposed within the housing, the opening having an inner surface adapted to receive a first end of a first pipe element; (c) a channel disposed within a wall of the housing, the channel having a wide cross-section disposed distal to the first opening, and a narrow cross-section disposed between the wide cross-section and the first opening; and (d) a lock pin having a backbone and a longitudinal tooth extending longitudinally therefrom, the backbone adapted to be received by the wide cross-section, the tooth adapted to be received by the narrow cross-section, the pin adapted to be urged along the open ended channel, whereby a bottom edge of the tooth protrudes through the narrow cross-section into the opening.

According to further features in the described preferred embodiments, when the first end is disposed within the housing, whereby an outer diameter of the first end is juxtapositioned against the inner surface, the tooth protruding into the opening impinges upon an outer surface of the pipe element, to lock the pipe element in place, with respect to the housing.

According to still further features in the described preferred embodiments, the lock pin has a first longitudinal end adapted to be inserted into the channel as a lead end, and a second longitudinal end adapted to trail behind the first longitudinal end.

According to still further features in the described preferred embodiments, the lock pin has a first longitudinal end adapted to be inserted into the channel as a lead end, and a second longitudinal end adapted to trail behind the first longitudinal end, and wherein a bottom edge of the longitudinal tooth is sloped, whereby a length of the tooth at the second longitudinal end exceeds a length of the tooth disposed towards or near the lead end.

According to still further features in the described preferred embodiments, the lead end of the lock pin has a screw contour, the screw contour adapted to freely pass through the wide cross-section.

According to still further features in the described preferred embodiments, the inner surface of the opening has a generally circular cross-section.

According to still further features in the described preferred embodiments, the wide cross-section of the channel has a generally circular cross-section.

According to still further features in the described preferred embodiments, the wide cross-section of the channel has a width W1, and the narrow cross-section has a width W2, and wherein a first ratio of W2 to W1 is less than 0.5.

According to still further features in the described preferred embodiments, the width ratio is less than 0.4.

According to still further features in the described preferred embodiments, the width ratio is less than 0.3.

According to still further features in the described preferred embodiments, the width ratio is less than 0.25.

According to still further features in the described preferred embodiments, the width ratio is less than 0.2.

According to still further features in the described preferred embodiments, the backbone of the channel has a width D, and the narrow cross-section has a width W4, and wherein a second ratio of W4 to D is less than 0.5.

According to still further features in the described preferred embodiments, the second ratio is less than 0.4.

According to still further features in the described preferred embodiments, the second ratio is less than 0.3.

According to still further features in the described preferred embodiments, the second ratio is less than 0.25.

According to still further features in the described preferred embodiments, the second ratio is less than 0.2.

According to still further features in the described preferred embodiments, the pipe connection assembly further includes a second opening disposed within the housing, the second opening having a second inner surface adapted to receive a second end of a second pipe element.

According to still further features in the described preferred embodiments, the pipe connection assembly further includes a second opening disposed within the housing, the second opening adapted to connect to a second pipe element.

According to still further features in the described preferred embodiments, the second pipe element is a fire sprinkler assembly.

According to still further features in the described preferred embodiments, the pipe connection assembly further includes a second open-ended channel disposed within the wall of the housing, the second channel having a second wide cross-section disposed distal to the second opening, and a second narrow cross-section disposed between the second wide cross-section and the second opening, the second channel fluidly communicating with the second opening via the second narrow cross-section; and (g) a second lock pin having a second backbone and a second longitudinal tooth extending longitudinally therefrom, the second backbone adapted to be received by the second wide cross-section, the second tooth adapted to be received by the second narrow cross-section, the second pin adapted to be urged along the second channel, whereby a second bottom edge of the second tooth protrudes through the second narrow cross-section into the second opening.

According to still further features in the described preferred embodiments, when the second end is disposed within the housing, whereby an outer diameter of the second end is juxtapositioned against the second inner surface, the tooth protruding into the second opening impinges upon an outer surface of the second pipe element, to lock the second pipe element in place, with respect to the housing.

According to still further features in the described preferred embodiments, the pipe connection assembly further includes a third opening.

According to still further features in the described preferred embodiments, the third opening is substantially perpendicular to the first and second openings.

According to still further features in the described preferred embodiments, the third opening is adapted to connect to a fire sprinkler assembly.

According to still further features in the described preferred embodiments, the third opening is adapted to receive a third pipe element.

According to still further features in the described preferred embodiments, the housing includes a generally annular recess disposed around the opening, the recess adapted to receive a sealing element.

According to still further features in the described preferred embodiments, the pipe connection assembly further includes this sealing element.

According to still further features in the described preferred embodiments, the sealing element is an O-ring.

According to still further features in the described preferred embodiments, the sealing element is a lip seal.

According to still further features in the described preferred embodiments, the backbone has a longitudinal length L, and a portion of a perimeter of the backbone has a screw contour along at least 50%, at least 70%, at least 80%, at least 90%, at least 95%, or along all of length L.

According to still further features in the described preferred embodiments, the backbone has, over at least a portion of a longitudinal length between the lead end and the tooth, a screw contour around an entire perimeter of the backbone.

According to another aspect of the present invention there is provided a method of securing a pipe or pipe fitting by means of a pipe connection assembly, substantially as described herein.

According to yet another aspect of the present invention there is provided a pipe connection assembly, substantially as described herein.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings:

FIG. 1b is a transverse cross-sectional view through the pipe connection of FIG. 1a;

FIGS. 4*a*-4*d* are transverse cross-sectional views of the pipe connection assembly of FIG. 2, showing sequential stages in the insertion of a lock screw to form a pipe joint assembly according to an embodiment of the present invention;

FIG. 9 provides a schematic, longitudinal cross-sectional view of the inventive pipe connection assembly of FIG. 6, the assembly containing and connecting between two pipes;

FIG. 15A provides a partial, schematic, longitudinal cross-sectional view of a pipe connector, according to one embodiment of the present invention;

FIG. 15B provides a schematic, transverse cross-sectional view of the pipe connector shown in FIG. 15A.

DESCRIPTION OF THE PREFERRED EMBODIMENTS

Figure 1A:
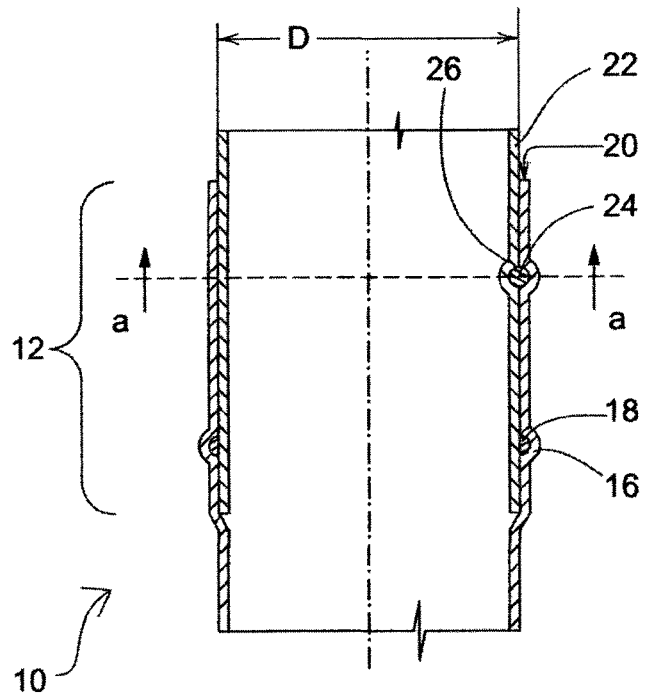
FIG. 1a is a longitudinal cross-sectional view through a pipe connection, according to the teachings of U.S. Pat. No. 6,634,677.

The principles and operation of the piping apparatus, fittings and methods according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 1B:
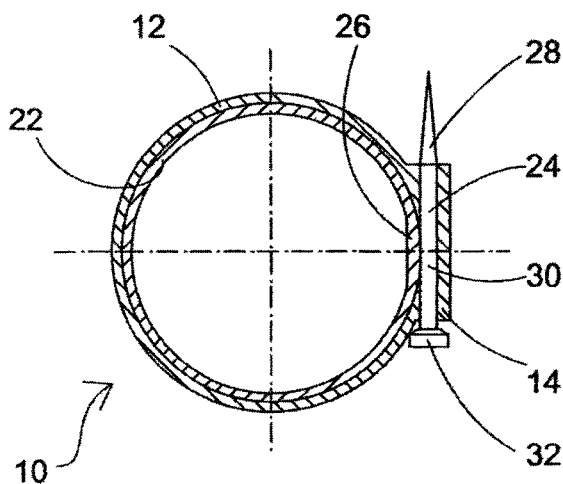

FIGS. 1*a* and 1*b* illustrate a prior-art teaching for connecting between pipe elements such as a pipe element 10. First, an end of a pipe 22 is inserted into a terminal portion 12 of pipe element 10, whereby an O-ring sealing element 18 forms a seal between pipe 22 and pipe element 10. A lock pin 24 is then inserted and forced along a channel 14 (shown in FIG. 1*b*), typically by means of hammer blows. This causes local inward deformation 26 of pipe 22, thereby locking together pipe 22 and pipe element 10.

Pin-like element 24 preferably has a pointed or wedge-shaped end 28 (shown in FIG. 1*b*), for guiding lock pin 24 along channel 14 to exert a gradually increasing deforming force against the wall of pipe 22. The main body 30 of lock pin 24 acts as a locking element. A slightly enlarged head 32 preferably serves to prevent over-insertion and to facilitate removal of lock pin 24, if required.

Figure 1C:
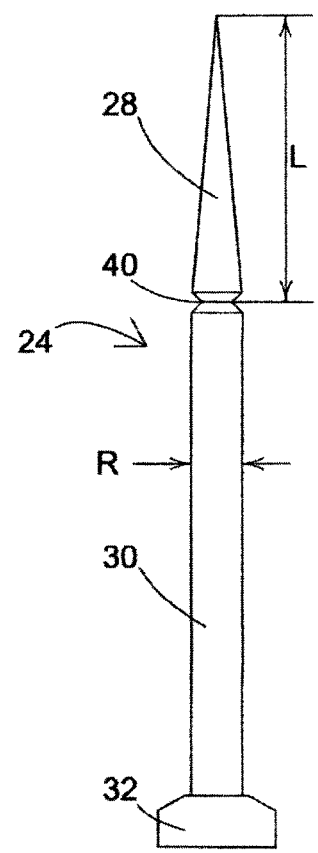
FIG. 1c provides a magnified view of a lock pin used in conjunction with the pipe connection shown in FIGS. 1a-1b.

A magnified view of pin 24 is provided in FIG. 1*c*. As shown, lock pin 24 has a pre-defined weakened region 40 adjacent to a junction of parallel-sided shaft portion 30 and tapered portion 28. Weakened region 40 facilitates the detachment of tapered end 28 of lock pin 24 after lock pin 24 is secured in a locking position.

Figure 1D:
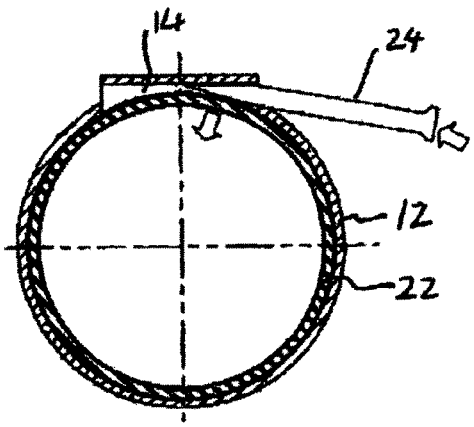
FIGS. 1*d*-1*f* show sequential stages in the insertion of a lock pin to form a pipe joint assembly according to the teachings of U.S. Pat. No. 6,634,677.
Figure 1E:
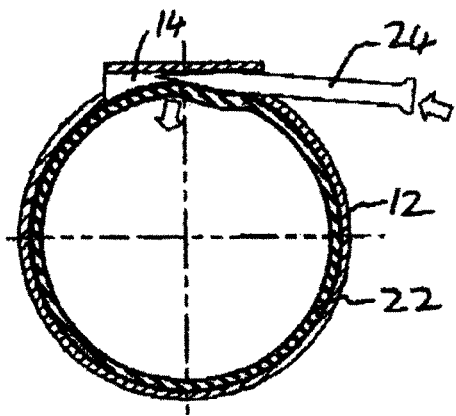
Figure 1F:
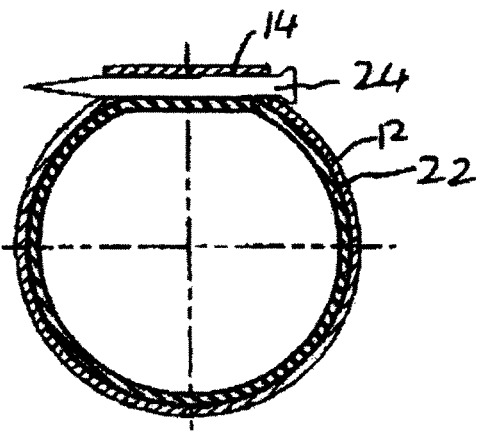

In the prior-art shown in FIG. 1*d*, insertion of pipe end 22 within the internal bore of connector element 12 generates a wedge-shaped crevice between the opposing surfaces. Lock pin 24 is then positioned whereby tapered end portion 28 is lodged within this wedge-shaped crevice such that the long dimension of lock pin 24 is non-parallel to the long dimension of channel 14. In this position, surfaces of tapered portion 28 bear simultaneously on surfaces of pipe end 22 and channel 14. Force is then applied to advance lock pin 24 through a combined linear and rotational displacement (sequence of FIGS. 1*d*, 1*e* and 1*f*) to effect local inward deformation of pipe end 22, until lock pin 24 reaches a locking position in which its long dimension lies parallel to the extensional direction of open-ended channel 14, thereby locking pipe end 22 within connector element 12.

I have found that my previous invention as disclosed in U.S. Pat. Nos. 5,927,763 and 6,634,677 may be fundamentally unsuitable for various types of piping, including large diameter copper pipes and steel pipes having a thickness exceeding 1.5 millimeters. In such piping, and in other types of piping, the wall of the pipe is extremely hard and unyielding, and may be substantially undeformable by the disclosed means.

Figure 2:
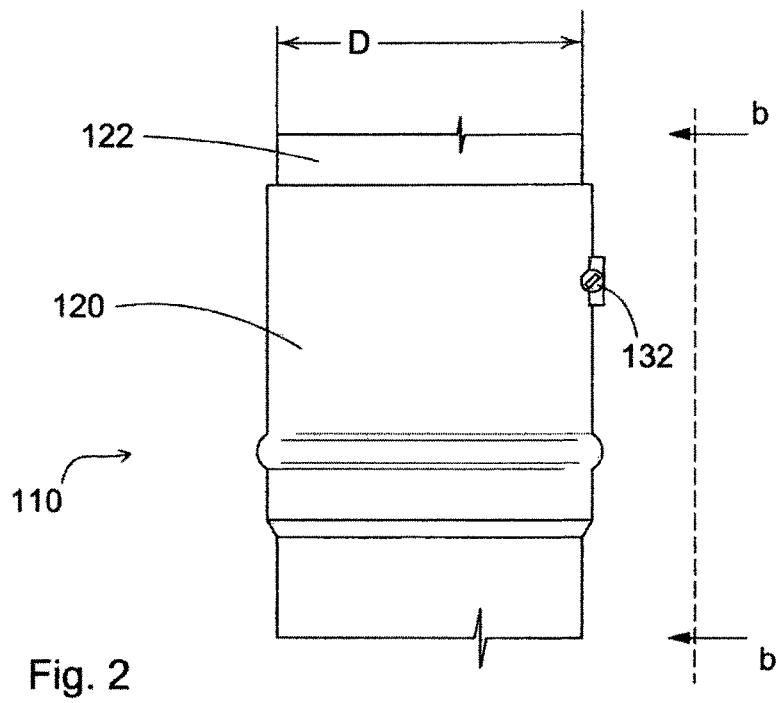
FIG. 2 provides a schematic top view of a pipe connection assembly according to an embodiment of the present invention.
Figure 3:
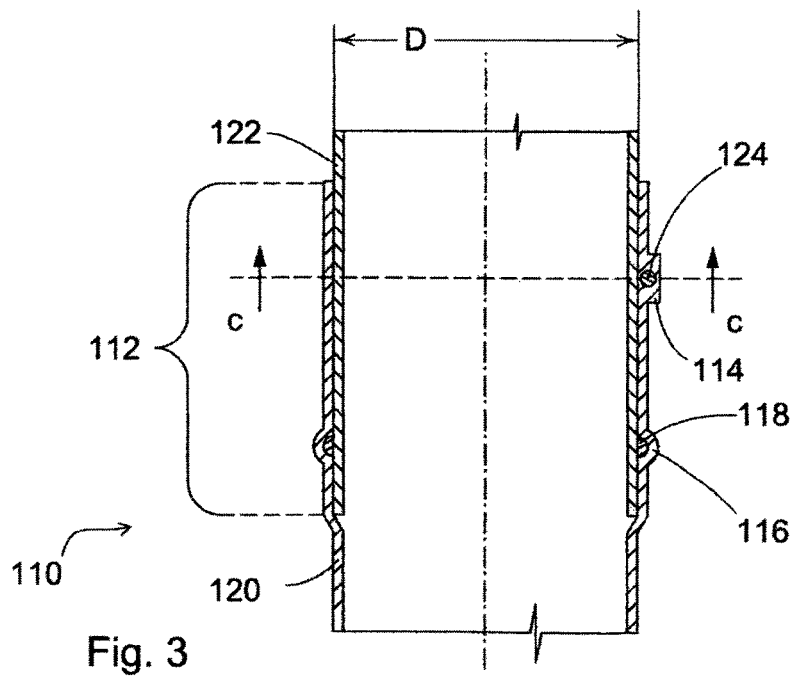
FIG. 3 provides a schematic, longitudinal cross-sectional view (b-b) through the pipe connection assembly of FIG. 2.

Referring again to the drawings, FIG. 2 provides a schematic top view of a pipe connection assembly 110 according to an embodiment of the present invention. FIG. 3 provides a schematic, longitudinal cross-sectional view (b-b) through pipe connection assembly 110 of FIG. 2. Referring collectively to FIGS. 2 and 3, pipe connection assembly 110 may include a pipe connecting arrangement 120, adapted to receive an end 122 of a pipe. Typically, an inner diameter of arrangement 120 exceeds an outer diameter of end 122. An inner surface of arrangement 120 may be contoured to generally match an outer contour of pipe end 122. Typically, these contours may be generally cylindrical.

An annular recess 116 of pipe connection assembly 110 holds in its place a sealing element 118 and is located so that an open-ended channel 114 is disposed between arrangement 120 and annular recess 116. Pipe end 122 may be inserted into an outer pipe terminal 112 such that a sealing element 118 forms a tight seal between pipe end 122 and the outer pipe terminal 112. A conical lock screw 124 may then be screwed into open-ended channel 114, locking together the pipe end 122 and outer pipe terminal 112.

With specific reference to FIG. 3, arrangement 120 may be equipped with a conical lock screw head 132, which may have a slit adapted to enable screwing with a flat screw driver. Other embodiments may optionally feature one or more other arrangements, such as a recessed hexagonal shape for screwing with an Allen wrench or a hexagonal head for screwing with a socket wrench.

FIGS. 4a-4d are transverse cross-sectional views (c-c of pipe connection assembly 110) depicting sequential stages in the insertion of conical lock screw 124 into open-ended channel 114, according to the present invention.

In FIG. 4a, conical lock screw 124 is inserted into open-ended channel 114. FIG. 4b shows conical lock screw 124 partially screwed into open-ended channel 114. In FIG. 4c, conical lock screw 124 is screwed all the way through open-ended channel 114. A screw tip 170 of screw 124 may protrude outside open-ended channel 114. FIG. 4d shows conical lock screw 124 in a position identical to that of screw 124 in FIG. 4c, but in truncated form, in which screw tip 170 has been detached.

Screw tip 170 may be a continuous part of conical lock screw 124, and its length may be contingent upon the dimensions of both conical lock screw 124 and open-ended channel 114.

Figure 5A:
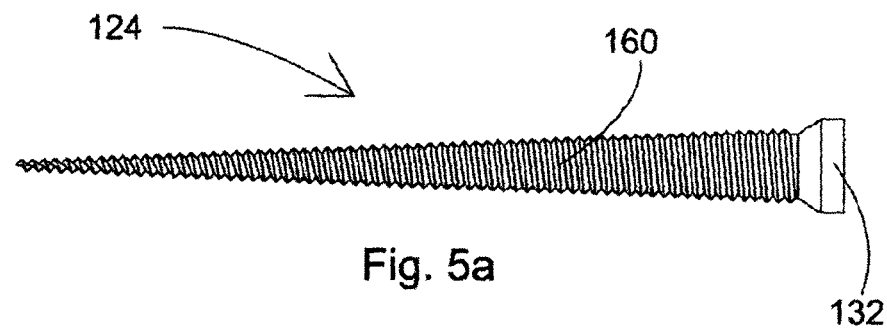
FIG. 5*a* is a schematic, exemplary illustration of a conical lock screw, according to one embodiment of the present invention.
Figure 5B:
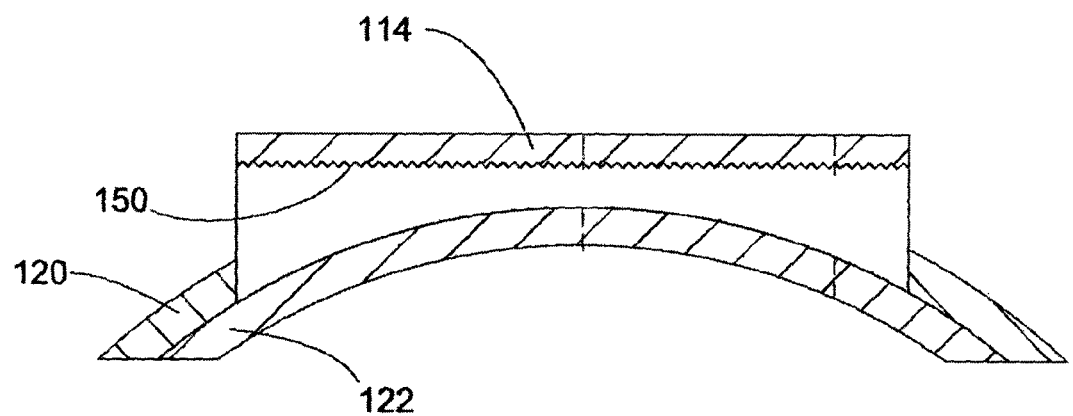
FIG. 5*b* is a transverse cross-sectional view (c-c) through the inventive pipe connection assembly of FIG. 2, without the lock screw.

FIG. 5a is schematic, exemplary illustration of conical lock screw 124, according to one embodiment of the present invention. FIG. 5b is a transverse cross-sectional view (c-c) through the inventive pipe connection assembly, without conical lock screw 124. Lock screw 124 may include conical lock screw head 132, described hereinabove, and a screw threading 160. Screw threading 160 may be generally complementary to a channel threading 150 of channel 114 (both shown in FIG. 5b). When lock screw 124 is screwed through channel 114, channel threading 150 is adapted to direct and guide conical lock screw 124 into the correct position.

Figure 6:
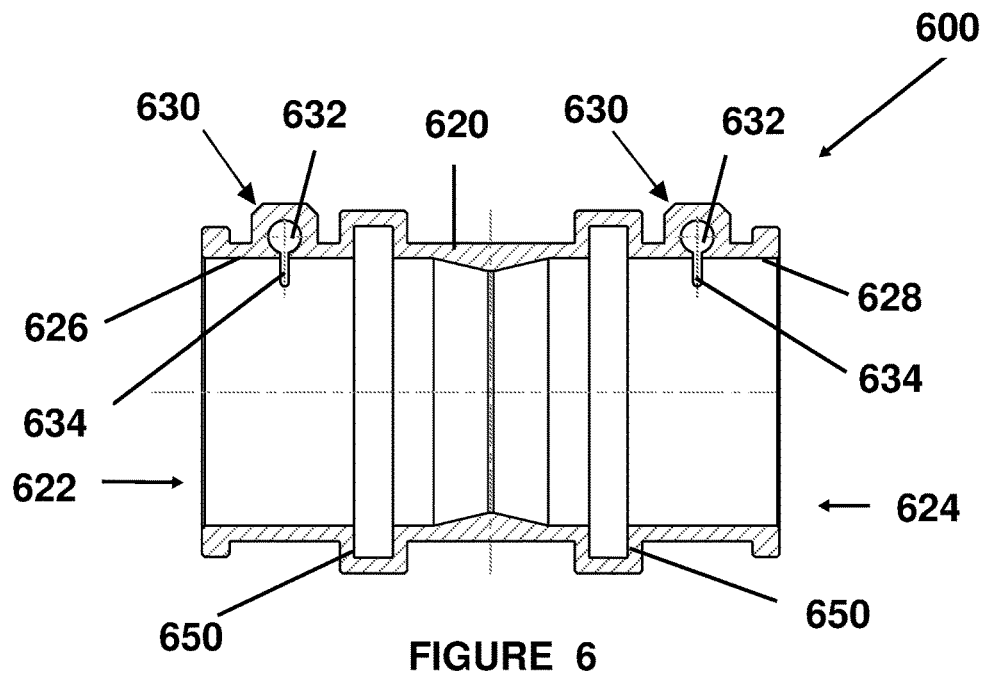
FIG. 6 provides a schematic, longitudinal cross-sectional view of a pipe connection assembly according to one embodiment of the present invention.

FIG. 6 provides a schematic, longitudinal cross-sectional view of a pipe connection assembly 600 according to one embodiment of the present invention. Pipe connection assembly 600 includes a housing 620 having or encompassing a first opening or terminal 622 and a second opening 624 that may be longitudinally aligned, or aligned at a predetermined angle (e.g., a right angle) with respect to first opening or terminal 622. First and second openings 622, 624 may each have, or be bounded by, a terminal surface 626, 628, adapted to receive a first end of respective pipe elements (as shown in FIG. 9).

Within a wall of housing 620 is disposed a channel, such as an open-ended channel 630, having a wide cross-section 632 disposed distal to first and second openings 622, 624, and a narrow cross-section 634 disposed between wide cross-section 632 and first and second openings 622, 624. Each channel 630 fluidly communicates with a respective opening of first and second openings 622, 624, via narrow cross-section 634. Channel 630 may be adapted to receive a lock pin, such as the lock pin provided in FIGS. 8A and 8B.

Housing 620 may further include a recess or geometry 650 (e.g., a generally annular recess) adapted to include or secure a sealing element such as an O-ring (not shown).

Figure 7:
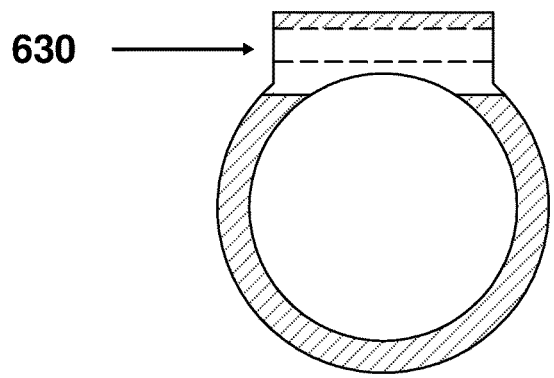
FIG. 7 is a transverse cross-sectional view of the inventive pipe connection assembly of FIG. 6, showing a longitudinal view of the channel for the lock pin (not shown)

FIG. 7 is a transverse cross-sectional view of the inventive pipe connection assembly of FIG. 6, showing a longitudinal view of channel 630.

Figure 8B:
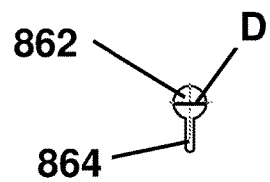
FIG. 8B provides a schematic end view of the lock pin of FIG. 8A.
Figure 8A:
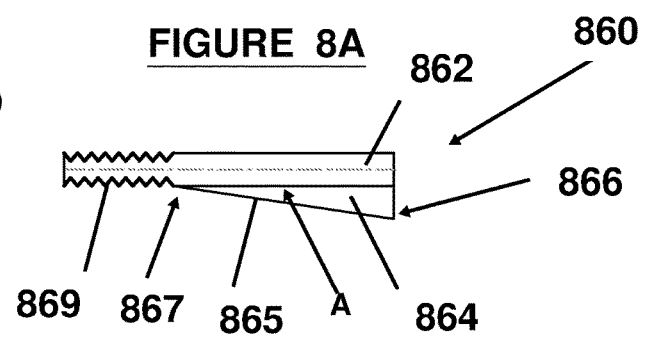
FIG. 8A is a schematic, exemplary illustration of a lock pin, according to one embodiment of the present invention.

FIG. 8A is a schematic, exemplary illustration of a lock pin 860, according to one embodiment of the present invention. In this embodiment, lock pin 860 has a backbone 862 and a longitudinal tooth or fin 864 extending—typically in radial fashion, from backbone 862, along a length of lock pin 860. Backbone 862 may be adapted to be received by wide cross-section 632 of channel 630 (provided hereinabove). Similarly, a first end of tooth 864 may be adapted to be received by narrow cross-section 634. Lock pin 860 may advantageously be adapted to be urged along channel 630, whereby a bottom edge 865 of tooth 864 protrudes through narrow cross-section into 634 and into first or second openings 622, 624 (shown in FIG. 6). Typically, bottom edge 865 is sloped, whereby a length of tooth 864 at a second or trailing longitudinal end 866 exceeds a length of tooth 864 at a first or leading longitudinal end 867.

Backbone 862 may be equipped with, at a leading end thereof, a contour or outer surface 869 of varying dimension. A tool may be adapted to latch onto this contour, whereby lock pin 860 may be pulled through channel 630. In FIG. 8A, by way of example, outer surface 869 has a screw contour.

FIG. 8B provides a schematic end view (from trailing longitudinal end 866) of lock pin 860. The width of tooth or fin 864 is less than the width or diameter D of backbone 862. Typically, the width of tooth or fin 864 is less than one-half, less than one-third, less than one-quarter, or less than one-sixth the width or diameter D of backbone 862.

Typically, the maximum length of tooth or fin 864 is at least 40%, at least 50%, at least 60%, at least 70%, at least 80%, or at least 90% of the width or diameter D of backbone 862.

The length of tooth or fin 864 may be at least 40%, at least 50%, at least 60%, at least 70%, at least 75%, or at least 80% of the inner width or diameter of the respective opening (e.g., first opening 622) of housing 620.

Referring back to FIG. 8A, the angle A between bottom edge 865 and a longitudinal axis of lock pin 860 may be, in one embodiment, at least 2°, at least 4°, at least 7°, at least 10°, at least 12°, or at least 15°. In one embodiment, angle A may be at most 45°, at most 40°, at most 35°, at most 30°, at most 25°, or at most 20°.

FIG. 9 provides a schematic, longitudinal cross-sectional view of pipe connection assembly 600, the assembly containing and connecting between a first pipe 927 having an outer (typically cylindrical) surface 931 and a second pipe 928 having an outer (typically cylindrical) surface 932.

A recess 650 in housing 620 may be adapted to include or secure a sealing element 651 such as an O-ring, which may tightly fit around surface 931 of pipe 927, whereby sealing is effected between surface 931 and terminal surface 626 of housing 620.

Figure 10A:
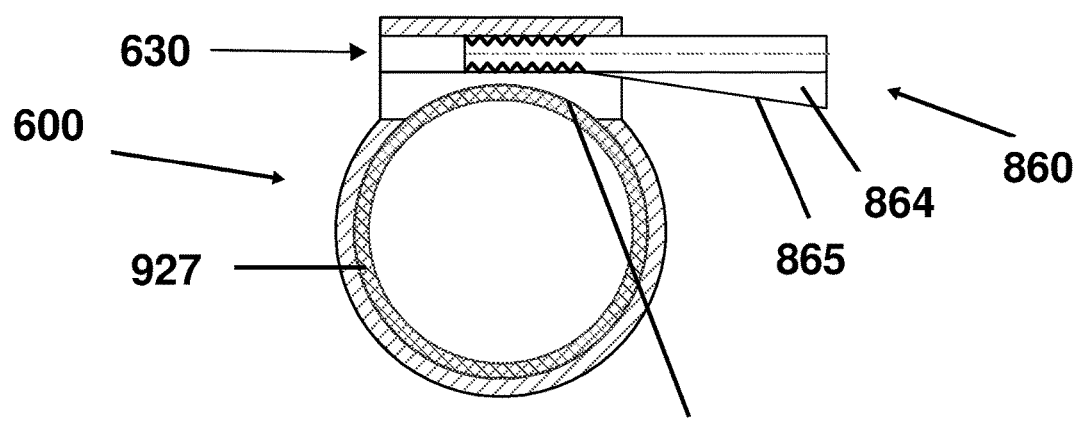
FIG. 10A provides a transverse cross-sectional view of FIG. 9, in which the lock pin is partially inserted in the lock-pin channel.

FIG. 10A provides a transverse cross-sectional view of FIG. 9, in which lock pin 860 is partially inserted in open-ended (lock-pin) channel 630. Initially, the insertion of lock pin 860 may proceed with facility and with little mechanical resistance. As the position of lock pin 860 proceeds longitudinally through channel 630, bottom edge 865 of tooth 864 will eventually contact outer surface 931 of pipe 927.

Figure 10B:
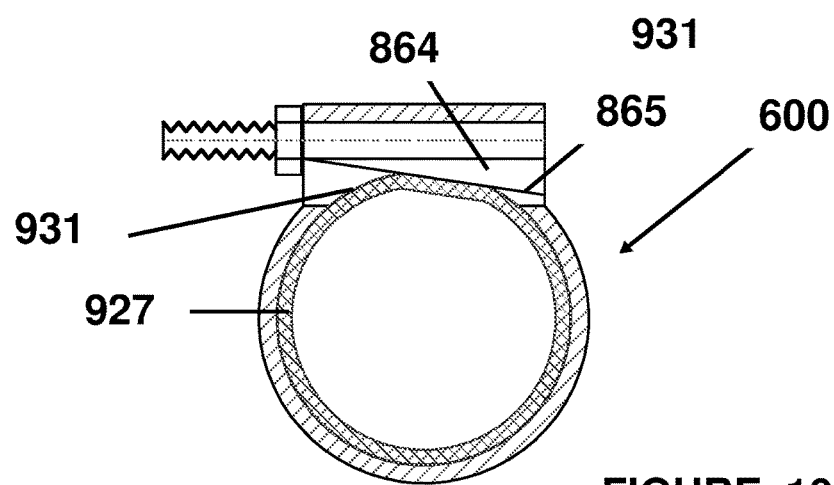
FIG. 10B provides a transverse cross-sectional view of FIG. 9, in which the lock pin is fully inserted in the lock-pin channel.

At this point, lock pin 860 may be driven (e.g., by hammering) or pulled (e.g., as described hereinabove) through channel 630. Bottom edge 865 of tooth 864 impinges upon outer surface 931 of pipe 927, and may even deform outer surface 931, to secure pipe 927 within pipe connection assembly 600, as shown in FIG. 10B.

Figure 11:
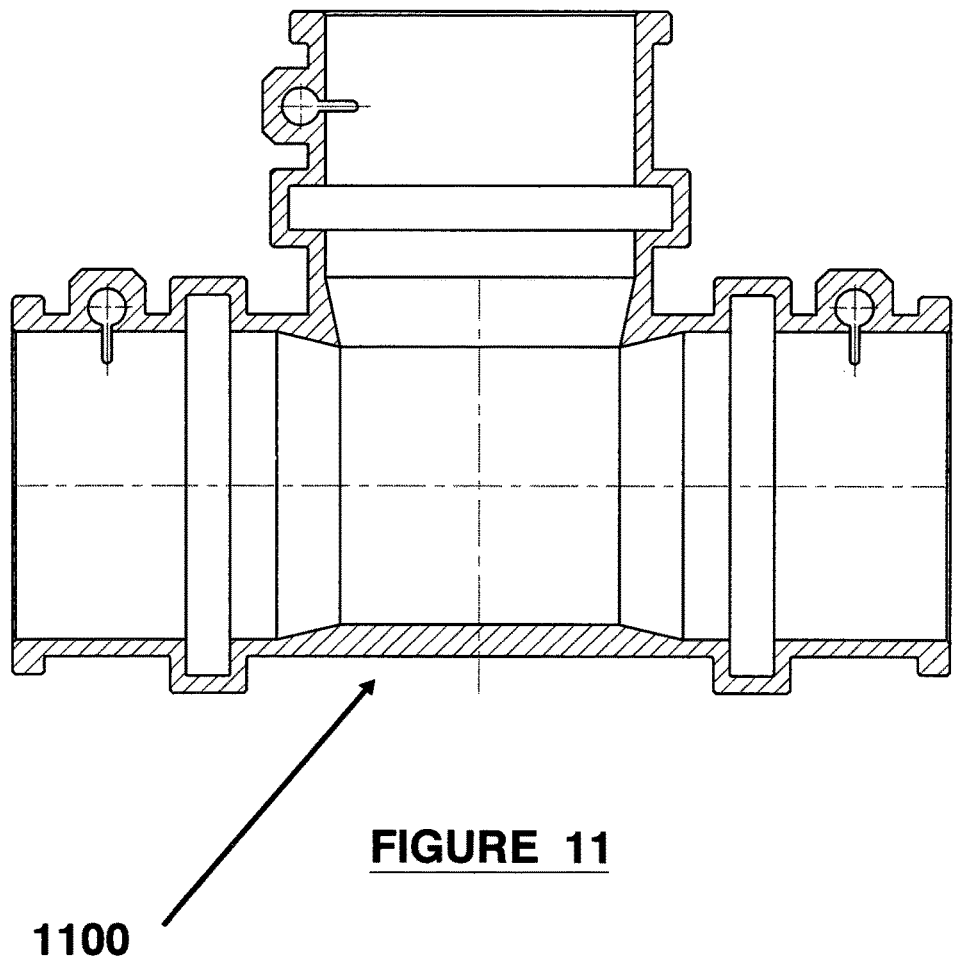
FIG. 11 provides a schematic, longitudinal cross-sectional view of a pipe connection assembly according to one embodiment of the present invention, in which the assembly is a three-way pipe adaptor.

FIG. 11 provides a schematic, longitudinal cross-sectional view of a pipe connection assembly 1100 according to one embodiment of the present invention, in which the assembly is a three-way pipe adaptor.

Figure 12:
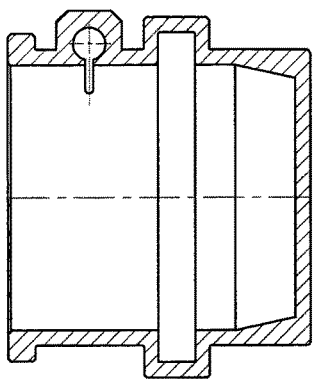
FIG. 12 provides a schematic, longitudinal cross-sectional view of a pipe connection assembly according to one embodiment of the present invention, in which the assembly is an end seal.

FIG. 12 provides a schematic, longitudinal cross-sectional view of a pipe connection assembly 1200 according to one embodiment of the present invention, in which the assembly is an end seal or fitting.

Figure 13:
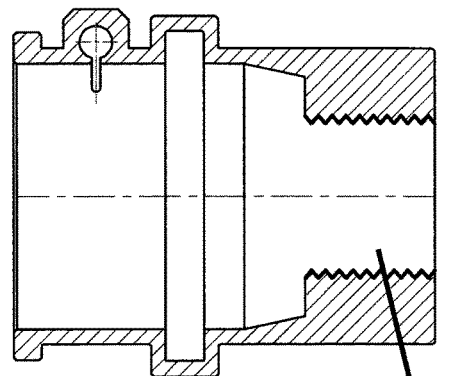
FIG. 13 provides a schematic, longitudinal cross-sectional view of a pipe connection assembly according to one embodiment of the present invention, in which one end of the assembly is a sprinkler fitting.

FIG. 13 provides a schematic, longitudinal cross-sectional view of a pipe connection assembly 1300 according to one embodiment of the present invention, in which one end of the assembly is a sprinkler fitting 1385.

Figure 14:
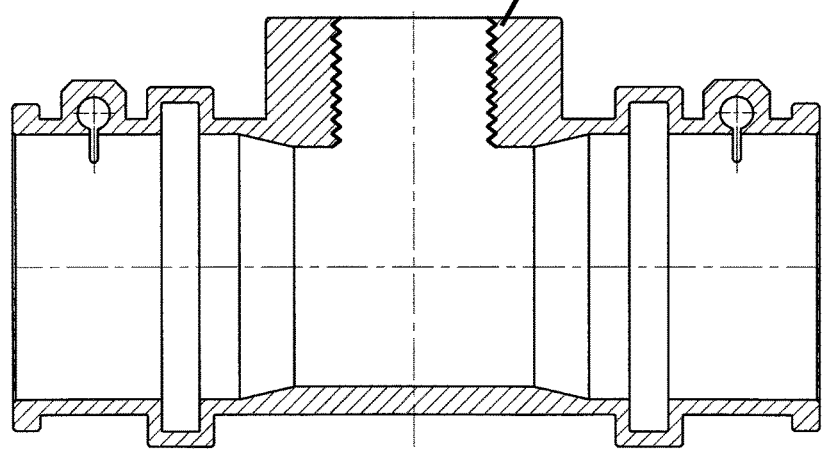
FIG. 14 provides a schematic, longitudinal cross-sectional view of a pipe connection assembly according to one embodiment of the present invention, in which the assembly is a three-way pipe adaptor having a sprinkler fitting.

FIG. 14 provides a schematic, longitudinal cross-sectional view of a pipe connection assembly 1400 according to one embodiment of the present invention, in which the assembly is a three-way pipe adaptor having a sprinkler fitting 1485.

FIG. 15A provides a partial, schematic, longitudinal cross-sectional view of a pipe connector, according to one embodiment of the present invention. FIG. 15B provides a schematic, transverse cross-sectional view of the pipe connector shown in FIG. 15A. In this embodiment, the pin backbone has a longitudinal length L, and at least a portion of a perimeter of the backbone has a screw contour along at least 50%, at least 70%, at least 80%, at least 90%, at least 95%, or along all of length L. In FIG. 15B, by way of example, the backbone has a screw contour along the entire length L. The backbone may have, over at least a portion of a longitudinal length L1 between the lead end and the tooth, a screw contour around an entire perimeter of the backbone. In FIG. 15B, by way of example, the entire perimeter of the backbone has a screw contour over the entire longitudinal length L1 between the lead end and the tooth.

Figure 16:
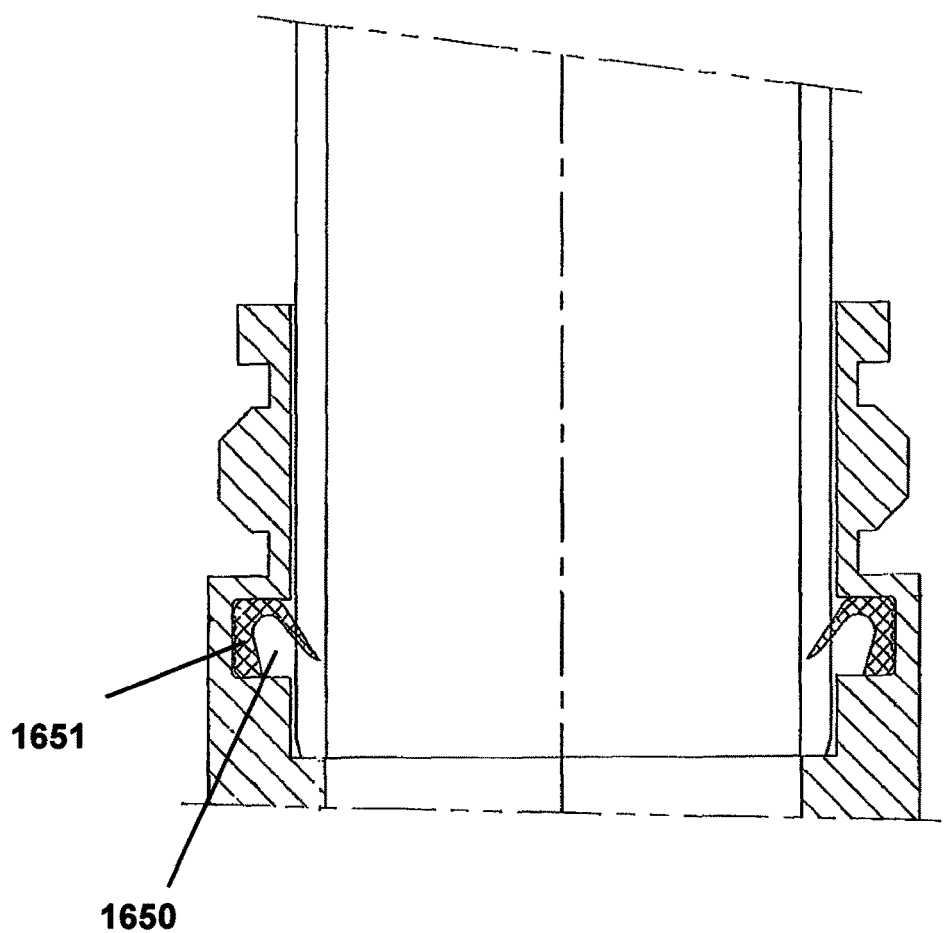
FIG. 16 provides a partial, schematic, longitudinal cross-sectional view of a pipe connection assembly having a lip seal recess and a lip seal disposed therein, according to one embodiment of the present invention.

FIG. 16 provides a partial, schematic, longitudinal cross-sectional view of a pipe connection assembly having a lip seal recess 1650 adapted to include or secure a sealing element 1651 such as a lip seal 1651, according to one embodiment of the present invention.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification, including U.S. Pat. Nos. 5,927,763 and 6,634,677, are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A pipe connection assembly comprising:
(a) a housing;
(b) a first opening disposed within said housing, said first opening having an inner surface, said first opening being adapted to receive a first end of a first pipe element;
(c) an elongate channel having openings at opposite ends thereof, said elongate channel disposed within a wall of said housing and being disposed transversely with respect to said inner surface, said elongate channel including a cylindrical portion having a first cross-section bounded by a circular projection and an elongate radial portion, extending radially outward from said circular projection, inward to a first axis of said first opening,
said elongate radial portion being elongated in a direction perpendicular to a longitudinal axis of said elongate channel, and towards said first opening,
said elongate radial portion having a second cross-section,
said first cross section being wider than said second cross section,
said elongate channel fluidly communicating with said first opening via said elongate radial portion; and
(d) a lock pin having a backbone and a single longitudinal fin extending radially therefrom, said backbone adapted to be received by said cylindrical portion, said fin adapted to be received by said elongate radial portion, said pin adapted to be urged along said elongate channel, whereby an edge of said fin protrudes through said elongate radial portion into said first opening.

2. The pipe connection assembly of claim 1, wherein, when said first end is disposed within said housing such that an outer diameter of said first end is juxtapositioned against said inner surface, said fin protruding into said first opening impinges upon an outer surface of said first pipe element, to lock said first pipe element in place, with respect to said housing.

3. The pipe connection assembly of claim 1, wherein said lock pin has a first longitudinal end adapted to be inserted into said elongate channel as a lead end, and a second longitudinal end adapted to trail behind said first longitudinal end.

4. The pipe connection assembly of claim 1, wherein said lock pin has a first longitudinal end adapted to be inserted into said elongate channel as a lead end, and a second longitudinal end adapted to trail behind said first longitudinal end, wherein said edge of said longitudinal fin is sloped relative to a longitudinal axis of said backbone of said pin, and wherein a length of said fin at said second longitudinal end exceeds a length of said fin disposed towards said lead end.

5. The pipe connection assembly of claim 4, wherein said lead end has a screw contour, said screw contour adapted to freely pass through said first cross-section portion.

6. The pipe connection assembly of claim 1, wherein said first cross-section of said generally cylindrical portion of said elongate channel has a width W1, and said second cross-section of said elongate radial portion has a width W2, and wherein a first ratio of W2 to W1 is less than 0.5.

7. The pipe connection assembly of claim 6, wherein said first ratio is less than 0.3.

8. The pipe connection assembly of claim 1, wherein said backbone of said locking pin has a width D, and said second cross-section has a width W4, and wherein a second ratio of W4 to D is less than 0.5.

9. The pipe connection assembly of claim 1, further comprising:
(e) a second opening disposed within said housing, said second opening having a second inner surface adapted to receive a second end of a second pipe element.

10. The pipe connection assembly of claim 9, the assembly further comprising:
(f) a second elongate channel having openings at opposite ends thereof, said second elongate channel disposed within said wall of said housing, said second elongate channel including a second generally cylindrical portion having a generally circular third cross-section and a second elongate radial portion, extending radially outward from said second cylindrical portion towards said second opening,
said second elongate radial portion being elongated in a direction perpendicular to a longitudinal axis of said second elongate channel, and towards said second opening,
said second elongate radial portion having a fourth cross-section,
said third cross section being wider than said fourth cross section,
said second elongate channel fluidly communicating with said second opening via said second elongate radial portion; and
(g) a second lock pin having a second backbone and a single second longitudinal fin extending radially therefrom, said second backbone adapted to be received by said second cylindrical portion, said second fin adapted to be received by said second elongate radial portion, said second pin adapted to be urged along said second elongate channel, whereby a second edge of said second fin protrudes through said second elongate radial portion into said second opening.

11. The pipe connection assembly of claim 10, wherein, when said second end is disposed within said housing, whereby an outer diameter of said second end is juxtapositioned against said second inner surface, said second fin protruding into said second opening impinges upon an outer surface of said second pipe element, to lock said second pipe element in place, with respect to said housing.

12. The pipe connection assembly of claim 11, further comprising a third opening, substantially perpendicular to said first and second openings, said third opening adapted to connect to a fire sprinkler assembly or to receive a third pipe element.

13. The pipe connection assembly of claim 1, further comprising:
(e) a second opening disposed within said housing, said second opening adapted to connect to a second pipe element.

14. The pipe connection assembly of claim 13, wherein said second pipe element is, or includes, a fire sprinkler assembly.

15. The pipe connection assembly of claim 1, wherein said housing includes a generally annular recess disposed around said first opening, said recess adapted to receive a sealing element.

16. The pipe connection assembly of claim 1, said lock pin and said elongate channel adapted such that as said lock pin is urged along said elongate channel, said edge of said fin protruding through said second cross-section into said first opening is adapted to apply pressure to a cylindrical outer surface of said first end of said first pipe element, when said first end is inserted into said first opening.

17. The pipe connection assembly of claim 16, further comprising said first pipe element.

18. A pipe connection assembly comprising:
(a) a housing;
(b) a first opening disposed within said housing, adapted to receive a first end of a first pipe element;
(c) an elongate channel having openings at opposite ends thereof, said elongate channel disposed within a wall of said housing and being disposed transversely with respect to said first opening, said elongate channel including a first portion having a first cross-section bounded by a circular projection and a second elongate radial portion, extending radially outward from said circular projection, inward to a first axis of said first opening,
said elongate radial portion being elongated in a direction perpendicular to a longitudinal axis of said elongate channel, and towards said first opening,
said elongate radial portion having a second cross-section,
said first cross section being wider than said second cross section,
said elongate channel fluidly communicating with said first opening via said elongate radial portion; and
(d) a lock pin having a backbone and a longitudinal sloped fin extending radially therefrom, said fin being sloped relative to a longitudinal axis of said backbone, said backbone adapted to be received by said first portion, said sloped fin adapted to be received by said second, elongate radial portion, said pin adapted to be urged along said elongate channel, whereby an edge of said sloped fin protrudes through said second elongate radial portion into said first opening.

19. A pipe connection assembly comprising:
(a) a housing;
(b) a first opening disposed within said housing, adapted to receive a first end of a first pipe element, said first end of said first pipe element having a smooth cylindrical outer surface;
(c) an elongate channel having openings at opposite ends thereof, said elongate channel disposed within a wall of said housing and being disposed transversely with respect to said first opening, said elongate channel including a cylindrical portion having a first cross-section bounded by a circular projection, and an elongate radial portion, extending radially outward from said circular projection, inward to a first axis of said first opening,
said elongate radial portion being elongated in a direction perpendicular to a longitudinal axis of said elongate channel, and towards said first opening,
said elongate radial portion having a second cross-section,
said first cross section being wider than said second cross section,
said elongate channel fluidly communicating with said first opening via said elongate radial portion; and
(d) a lock pin having a backbone and a longitudinal fin extending radially therefrom, said backbone adapted to be received by said cylindrical portion, said fin adapted to be received by said elongate radial portion, said pin adapted to be slidably urged along said elongate channel, whereby an edge of said fin protrudes through said elongate radial portion into said first opening,
said lock pin and said elongate channel adapted such that as said lock pin is slidably urged along said elongate channel, said edge of said fin protruding through said elongate radial portion into said first opening is adapted to slide along said smooth cylindrical outer surface of said first end of said first pipe element and to apply pressure thereto, when said first end is inserted into said first opening.

\* \* \* \* \*